Sept. 22, 1970  C. F. VASILE  3,530,409
TWO-PORT MAGNETOELASTIC DELAY LINE
Filed Sept. 24, 1968
4 Sheets-Sheet 1

Sept. 22, 1970   C. F. VASILE   3,530,409
TWO-PORT MAGNETOELASTIC DELAY LINE

Filed Sept. 24, 1968   4 Sheets-Sheet 4

United States Patent Office 3,530,409
Patented Sept. 22, 1970

3,530,409
TWO-PORT MAGNETOELASTIC DELAY LINE
Carmine F. Vasile, Greenlawn, N.Y., assignor to
Hazeltine Research Inc., a corporation of Illinois
Filed Sept. 24, 1968, Ser. No. 762,067
Int. Cl. H03h 7/30, 9/30, 9/34
U.S. Cl. 333—30    18 Claims

ABSTRACT OF THE DISCLOSURE

A two-port magnetoelastic delay line having a sample of single crystal magnetic insulator material such as yttrium iron garnet (YIG) having a polished face and located in an axially varying magnetic bias field. Electromagnetic energy is coupled to the YIG material through a shielded coupling device which is positioned adjacent to the polished face and which includes a current carrying wire and a shielding ground plane which confines the field produced by current flow in the wire. The energy propagates in the YIG bar in the form of medium-K waves, high-K exchange spin-waves and elastic waves and returns to the polished face with a specified delay. A second shielded coupling device similar to the first and also positioned at the polished face of the YIG detects the return wave and produces a signal representative of the signal in said input coupling device delayed by a predetermined amount. Undelayed leakage through the air is prevented by having the two coupling devices shielded from each other and undelayed leakage through the YIG is prevented by separating the wire conductors by a distance equal to at least one-third their length. Alternative arrangements are also covered.

The present invention relates generally to delay lines and more particularly to two-port magnetoelastic delay lines in which electromagnetic energy is coupled to and from magnetic insulator material by two separate coupling elements.

Exchange spin-wave propagation in yttrium iron garnet (YIG) was at first merely an observed, unexplained phenomenon. The origin of the spin-wave was unknown. The subsequent prediction that it was possible to couple to the exchange spin-wave has resulted in many endeavors to produce practical devices utilizing exchange spin wave propagation. Of particular interest are the endeavors to construct dispersive and nondispersive delay lines utilizing exchange spin-wave propagation. Nondispersive delay lines are widely used in signal processing. Dispersive delay lines are of special interest in pulse compression filters. At present a pulse compression filter is a comparatively complicated electronic circuit. A practical YIG dispersive delay line would make possible the miniaturizing of the pulse compression function and enable more sophisticated signal processing.

The prior art attempts at constructing practical YIG dispersive delay lines all have had severe limitations. None has yielded satisfactory operating results and generally they have been difficult to fabricate and/or suffer from critical alignment problems.

Objects of the present invention therefore are to provide new and improved YIG delay lines, particularly to provide new and improved two-port magnetoelastic YIG delay lines which are simple to construct, do not suffer from critical alignment problems and can be readily reproduced.

In accordance with the present invention there is provided a two-port magnetoelastic delay line comprising a sample of magnetic insulator material having a surface area capable of reflecting elastic waves, first shielded coupling means including a first conductor having a portion of its length contiguous to the surface area for launching a medium-K wave in the magnetic insulator and means for subjecting the magnetic insulator material to a spatially varying magnetic bias field which increases from the surface area into the magnetic insulator material for causing the medium-K wave to convert to an exchange spin-wave having a propagation component in the direction of the surface area, which exchange spin-wave converts to an elastic wave which is reflected from the surface area. The elastic wave reconverts to an exchange spin-wave, which continues to propagate away from the surface area, which spin-wave reconverts to a second medium-K wave which propagates back towards the surface area. The invention further comprises a second shielded coupling means including a second conductor for coupling the energy contained in the second medium-K wave from the magnetic insulator to produce a signal in the second conductor representative of the high frequency signal in the first conductor delayed by a predetermined amount, the second conductor being separated and shielded from the first conductor and having a portion of its length contiguous to the surface area at a position separated from the region of the magnetic insulator which is highly excited by the first conductor by a distance sufficient to insure that undelayed leakage is not coupled directly from the first conductor through the magnetic insulator material to the second conductor in an amount greater than the delayed energy coupled to the second conductor.

For a better understanding of the present invention together with other and further objects thereof, reference is had to the following description taken in connection with the accompanying drawings, and its scope will be pointed out in the appended claims.

Referring to the drawings.

DESCRIPTION OF FIG. 1

Figure 1A:
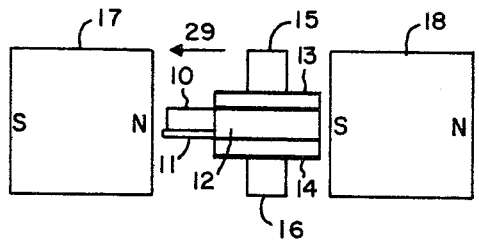
FIGS. 1a, 1b and 1c illustrate a two-port magnetoelastic delay line constructed in accordance with the present invention.
Figure 1B:
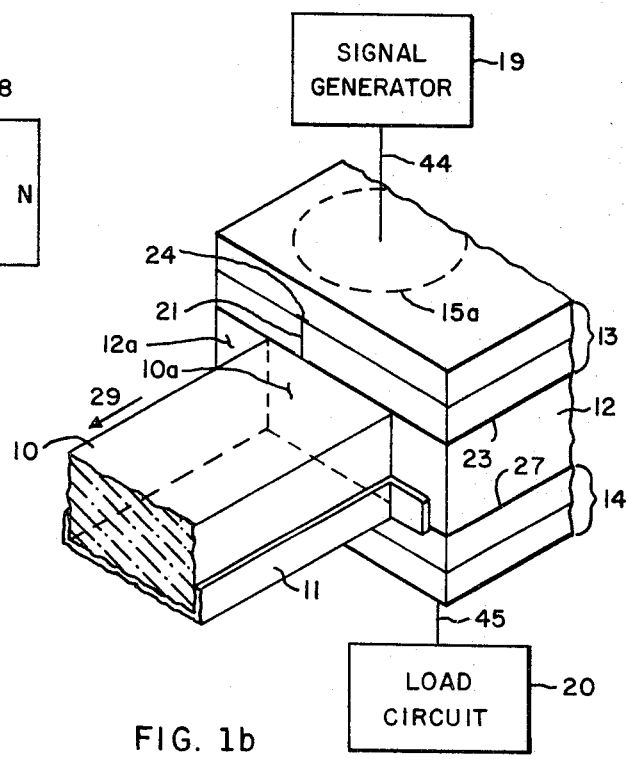
Figure 1C:
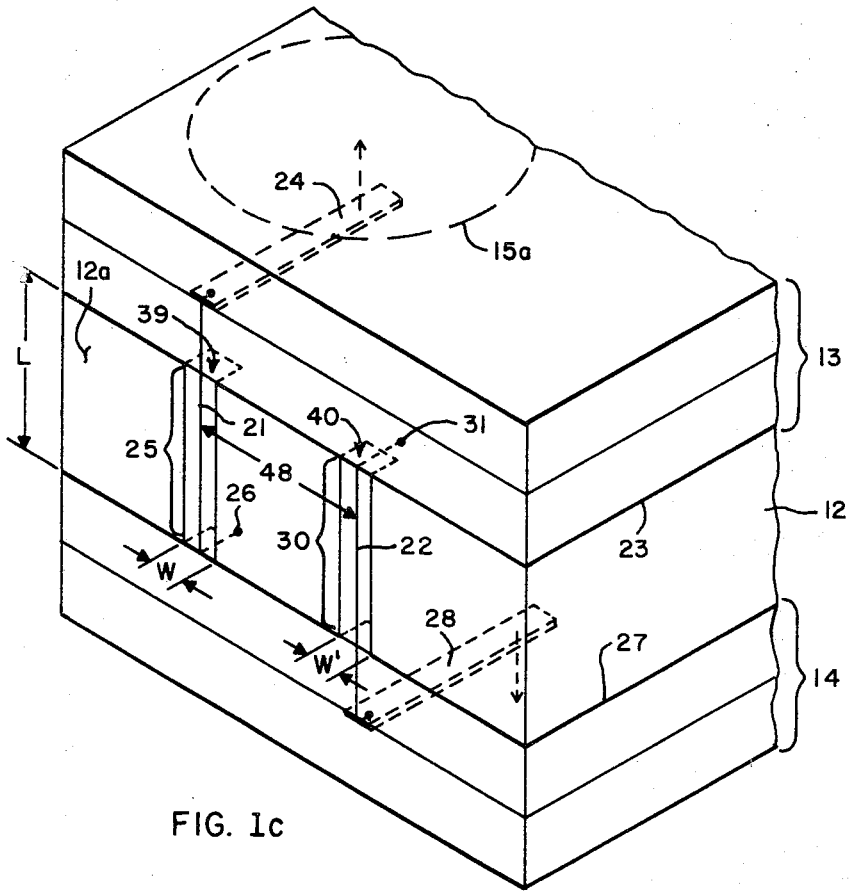

FIGS. 1a through 1c illustrate a two-port magnetoelastic delay line constructed in accordance with the present invention.

FIG. 1a is a side view of the delay line shown approximately actual size. FIG. 1a illustrates a sample of magnetic insulator material 10 positioned in a plastic channel 11 which is secured to the side of the block of conductive material 12. Signals are coupled to and from the delay line by the connectors 15 and 16 and strip-line sections 13 and 14. The magnetic insulator 10 is positioned between the permanent magnets 17 and 18 in order to subject the magnetic insulator material to a magnetic bias field.

FIG. 1b is an expanded isometric view of a section of the FIG. 1a delay line in which the connectors 15 and 16, permanent magnets 17 and 18, a portion of the magnetic insulator material 10 and strip-lines 13 and 14 have been removed and in which schematic representations of a signal generator 19 and a load circuit have been included.

FIG. 1c is a further expanded view of FIG. 1b in which the magnetic insulator material 10 and the plastic channel 11 have been removed to more clearly illustrate the coupling device including thin conductors 21 and 22.

As stated, the delay line includes a sample of magnetic insulator material 10. Due to its low loss characteristics, yttrium iron garnet (YIG) is the preferred type of magnetic insulator. The YIG material 10 may be in any shape or form but usually is constructed in the form of a slab, a bar or cylindrical rod. However, the type of bias field required, which is described below, is easier to achieve in the bar configuration illustrated in FIG. 1 or in the cylindrical rod as opposed to a slab configuration.

To date, the type of wave propagation required to produce a delay line in accordance with the present invention has only been observed in single crystal samples of YIG, and therefore samples of single crystal YIG are preferred. In addition, the best results have been achieved with a [100] oriented YIG bar; i.e., a single crystal YIG bar which has the long axis parallel to the crystallographic axis.

The YIG material must have a surface area 10a capable of reflecting elastic waves. In the FIG. 1 embodiment the face 10a of the YIG material which is contiguous to the block of conductive material 12 is polished so that it will reflect elastic waves.

The delay line also includes input means for receiving a high frequency signal, having a range of predetermined frequency components, which is to be delayed. Included in this means is a transmission line such as the section of strip-line 13 having a grounded conductor 23 and an ungrounded conductor 24. The strip-line 13 is coupled to the signal generator 19 via the connector 15 and transmission line 44.

The delay line further includes a first shielded coupling means for coupling electromagnetic energy to the magnetic insulator material 10 representative of said high frequency signal. The coupling device includes a shielding member such as the block of conductive material 12 having a groove 25 and a thin conductor 21 positioned in the groove 25. The thin conductor 21 is connected at one end of the groove 25 to the ungrounded conductor 24 of transmission line 13 and is connected at the other end of groove 25 to the bottom of the block of conductive material 12 at junction 26. The block of conductive material 12 is connected to the grounded conductor 23 along its length.

The delay line further includes a utilization load means for translating a high frequency signal representative of the supplied high frequency signal delayed by a predetermined amount. The utilization load means includes a transmission line illustrated as a portion of strip-line 14 having a grounded conductor 27 and an ungrounded conductor 28, said transmission line being coupled to the load circuit 20 via connector 16 and transmission line 45. The grounded conductor 27 is connected to the block of conductive material 12 along the length of conductor 27.

The delay line further includes means 17 and 18 for subjecting the magnetic insulator material to a spatially varying magnetic bias field which increases from the polished face 10a into the magnetic insulator material in the direction of arrow 29. Placing magnetic material such as YIG between the two permanent magnetics 17 and 18 will produce a spatially varying magnetic field in the YIG material 10. The field increases away from the polished face toward the center of the material where it then will begin to decrease in the direction of the opposite face. To achieve the operation described below, the field must be increasing along the length of the YIG bar 10 in which the desired wave propagation occurs. However, if the bar is sufficiently long, all the wave propagation of interest will occur before the point where the field begins to decrease. If the bar is not long enough, a piece of polycrystal YIG may be butted up against the face of the YIG opposite the polished face 10a in order to cause the magnetic field to increase for a greater distance through the single crystal piece 10.

For convenience, the means for producing the bias field is illustrated as a pair of permanent magnets 17 and 18 having the particular north-south pole orientation illustrated. Other appropriate orientations or types of magnets may be used. An electromagnet or any other suitable device may be utilized. The important criteria is that the field to which the YIG 10 is subjected is sufficient to saturate the YIG 10 in order to provide the desired wave propagation.

The delay line further includes second shielded coupling means for coupling electromagnetic energy from said magnetic insulator material 10 for producing an output signal representative of the high frequency signal coupled to said first conductor 21 delayed by a predetermined amount. Said second shielded coupling means includes the stated shielding member 12 illustrated as a block of conductive material 12 including a second elongated groove 30 and a second thin conductor 22 positioned along the length of said second groove 30. The second thin conductor 22 is connected at one end to the block of conductive material 12 at junction 31 and at the opposite end to the ungrounded conductor 28 of strip-line 14. The signal developed in conductor 22 which is representative of the signal flow in conductor 21, delayed by a predetermined amount, is thereby coupled through strip-line 14, connector 16 and transmission line 45 to the load circuit 20.

The thin conductors 21 and 22 are shielded from one another against propagation through the air by having their fields confined by the shielding member 12. Undelayed leakage through the magnetic insulator 10 is prevented by locating the second thin conductor 22 at a position separated from the region of the magnetic insulator which is highly excited by the first conductor by a distance sufficient to insure that any undelayed energy coupled directly from the first conductor 21 through the magnetic insulator material 10 to the second conductor 22 is less than the delayed energy coupled to conductor 22.

OPERATION OF FIG. 1

As previously described the YIG material 10 is capable of providing a dispersive delay making it particularly attractive as a component of a pulse compression filter. However, the device may also find application as a nondispersive delay line, for example by suitably shaping the bias field. In either case the signal to be delayed is a high frequency signal in the range of 350 mHz. to 10 gHz. Generally speaking, YIG material has been utilized with signal frequencies between 1 gHz. and 2.5 gHz.

The signal to be delayed is coupled from the signal generator 19 through the connector 15, the center conductor of strip-line 13 to the thin conductor 21. The polished face 10a of the YIG material 10 is adjacent to and preferably in direct contact with conductor 21 and therefore current flowing in conductor 21 causes electromagnetic energy to be coupled to the YIG material 10 in the region of the polished face 10a thereby launching a medium-K wave in the YIG material 10.

Figure 2:
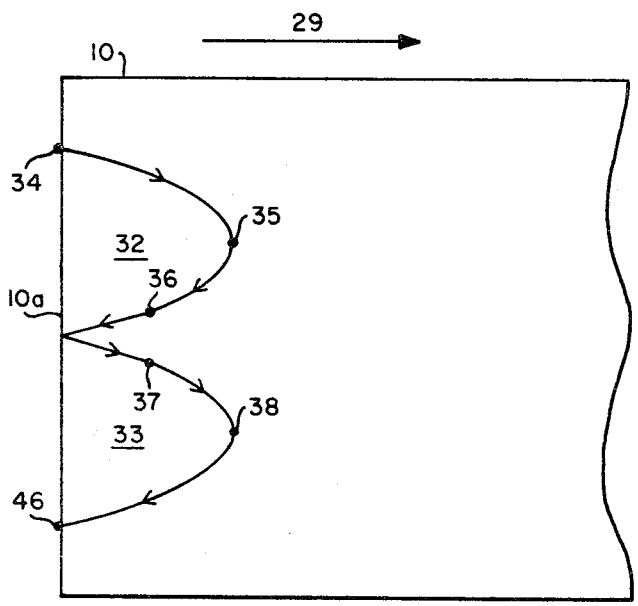
FIG. 2 is a representation of idealized wave propagation in a YIG bar.
Figure 4:
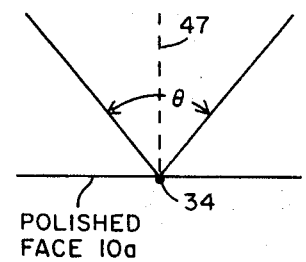
FIG. 4 illustrates the radiation characteristics of a wave launched into a YIG bar.

FIG. 2 illustrates the type and direction of wave propagation that may occur in the YIG material 10. FIG. 2 is an illustration of an idealized configuration in which the axis of the YIG bar 10 is coaxial with the magnetic field indicated by arrow 29. It has been empirically determined that best operation is obtained by tilting the axis of the YIG with respect to the magnetic field axis. The YIG 10 is positioned in the magnetic field at an angle which minimizes the insertion loss and the spurious signals which occur at twice the desired delay. The proper orientation must be empirically determined. Among other things, it depends on the strength and shape of the magnetic fields and the length of the YIG bar. It has been found that the proper orientation will even vary with different YIG samples. Generally, with the YIG properly aligned for a minimum insertion loss and minimum spurious signals the YIG axis is no more than 15 degrees off the magnetic field axis.

The effect that tilting the YIG bar with respect to the magnetic field axis has on the idealized waveform of FIG. 2 is not fully understood. It is believed that the propagation path segments 32 and 33 are not symmetrical and accordingly, the branch points 35 and 38 do not occur at the same distance from the polished face 10a. Even though the shape of the propagation path in the preferred case is not exactly as illustrated, FIG. 2 will be explained in order to facilitate an understanding of the type of waves propagated and some understanding of the direction of propagation. The terms medium-K and high-K exchange spinwave, which are used below have been used in the literature. See the article by Carmine F. Vasile and Richard LaRosa entitled "Guided Wave Propagation In Gyromagnetic Media As Applied To the Theory of Exchange Spin Wave Excitation," appearing in the Journal of Applied Physics, vol. 39, No. 3, pages 1863–1873 dated Feb. 15, 1968.

As indicated in FIG. 2 the medium-K wave propagates away from the launch point 34 located on the polished face 10a and which corresponds to the position of conductor 21. As the wave propagates away from the polished face 10a in the direction indicated by the arrowheads, the wavelength decreases due to the increasing bias field until it reaches the branch point 35 where the medium-K wave converts to a high-K exchange spin-wave. The exchange spin-wave has a component of propagation back in the direction of the polished face 10a.

The branch point 35 must occur within the region of increasing magnetic bias field. For a relatively long YIG bar, for example a bar which is 0.3 inch long, the branch point will occur before the middle of the bar and therefore within the region of increasing bias field. If the bar is short the length of the branch point might fall outside the region of increasing bias field. However, the magnetic field can be shaped to cause the region of increasing magnetic bias field to occupy a greater portion of the length of the bar. For example, a length of polycrystal YIG placed adjacent to the single crystal bar 10 at the end of the bar opposite the polished face 10a causes a larger portion of the single crystal YIG bar 10 to have an increasing bias field.

The wavelength of the high-K exchange spin-wave propagating towards the polished face 10a continues to decrease until it reaches the point 36 where the wavelength approximates the wavelength of an elastic wave. At this point the high-K exchange spin-wave converts to an elastic wave of corresponding wavelength. The elastic wave continues to propagate in the direction of the polished face 10A where it is reflected and propagates away from the polished face to the point 37 where it reconverts to a high-K exchange spin-wave. The exchange spin-wave continues to propagate away from the polished face until it reaches the branch point 38 where it reconverts to a medium-K wave. The medium-K wave propagates towards the polished face 10a where it induces a current flow at reception point 46 in conductor 22 which is related to the original current flow in conductor 21 delayed by a predetermined amount. The delayed signal is then coupled through the strip-line 14 and connector 16, to the load circuit 20 for further signal processing.

One of the major difficulties associated with producing a practical YIG delay line has been in achieving an output which can be separated from the input and whose level is greater than the undelayed leakage. Undelayed leakage refers to the energy which couples directly from the input conductor 21 to the output conductor 22 either through the air or through the YIG 10 without undergoing any delay. In the present invention shielding against direct coupling through the air is achieved by shielding the input and output conductors 21 and 22 respectively as illustrated. Shielded conductors of this type are the subject matter of the copending application of Edward F. Heldt, Ser. No. 762,062, filed on Sept. 24, 1968 and entitled "Electromagnetic Coupling Apparatus." This type of coupler is described and the operation fully explained in said copending application. In brief, the input and output couplers respectively consist of a block of conductive material having grooves 25 and 30, each of whose width is less than .03 times the shortest free space wavelength of the signal to be delayed, traversed by conductors 21 and 22 which are substantially parallel and connected to the block of conductive material at junctions 26 and 31 respectively. In the region of grooves 25 and 30 conductors 21 and 22 are separated from the block of conductive material 12 by dielectric sections of material 39 and 40 placed in the grooves 25 and 30, respectively, between the conductors 21 and 22 and the walls of the block of conductive material 12. Conductors 21 and 22, whose widths are less than .010 inch, are preferably placed inside the respective grooves 25 and 30 flush with the front face 12a so as to make direct contact with the YIG material 10 which is butted against the front face 12a. The width of each of the grooves is less than one-eighth of an inch.

The block of conductive material 12 confines the electromagnetic fields produced by current flow in each of the conductors 21 and 22. Placing the conductors 21 and 22 in their respective grooves 25 and 30 confines the relevant fields primarily to the width of the groove thereby preventing any substantial coupling between conductors 21 and 22 through the air. Grooves 25 and 30 also serve to shield the YIG material 10 from much of the return currents. Most of the return currents will flow in the side walls of the respective grooves and the field associated with them will not couple to the YIG, thereby reducing a potential source of spurious coupling.

Direct undelayed coupling through the YIG bar 10 is avoided by locating the output coupler conductor 22 at a position separated from the region of the YIG material 10 which is highly excited by the input coupled conductor 21 by a distance sufficient to insure that any undelayed energy coupled directly through the YIG from conductor 21 to conductor 22 is substantially less than the delayed energy coupled to conductor 22. According to the teaching of the prior art, exciting the polished face 10a by passing current through the input conductor 21 produces an effect across the polished face 10a which is analogous to launching a plane wave, i.e., the entire polished face 10a would be excited to a substantially equal degree. Applicant has discovered that, in fact, the wave launched by current flow in conductor 21 propagates in a relatively narrow angle $\theta$, centered around the longitudinal axis 47 of the YIG bar 10, as illustrated in FIG. 3. Outside the angle $\theta$ the energy decays rapidly and very possibly exponentially. Accordingly, there is no substatnial radiation transverse to the axis of the magnetic field, i.e., along the polished face 10a.

The amount of separation between conductors required to prevent substantial undelayed coupling through the YIG is related to the length of the conductors. The conductors 21 and 22 must be separated by at least one-third the length L of the longer conductor in order to achieve the desired isolation. With this minimum spacing as the lower limit, the optimum spacing must be empirically determined. The farther apart the couplers are, the better the isolation but a point is reached where the coupling efficiency is impaired. In any case, the coupling conductors 21 and 22 should not be placed in the vicinity of the edge of polished face 10a.

Figure 3A:
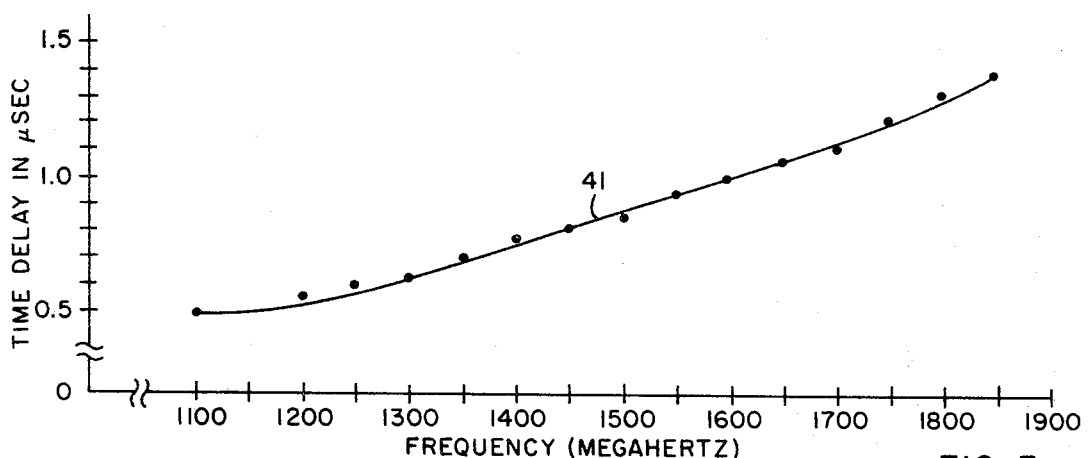
FIGS. 3a and 3b are graphical illustrations of the performance of a FIG. 1 delay line actually constructed and tested.
Figure 3B:
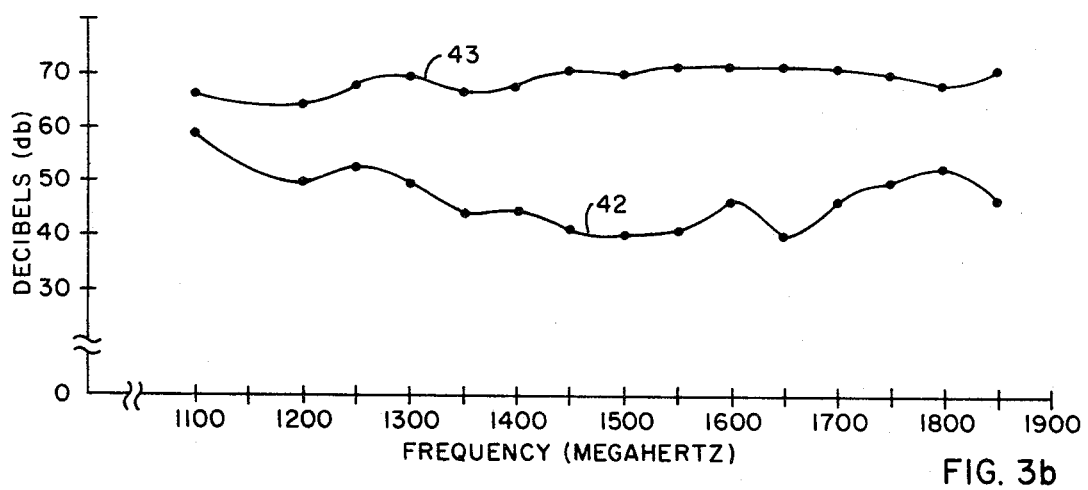

FIGS. 3a and 3b are graphical illustrations of the results obtained with a delay line constructed in accordance with FIGS. 1a through 1c. The relevant parameters are listed below.

[100] single crystal YIG bar—.140 in. x .140 in. x .310 in.

Wire size of conductor 21—.002 in.
Wire size of conductor 22—.002 in.
Width of groove 25—.030 in.
Width of groove 30—.030 in.
Distance 48 between conductors 21 and 22—.080 in.
Permanent magnets 17 and 18—3 stacked 1 in. x 1 in. x 4 in barium ferrite magnets (Indiana General—Indox. V) for each.

Since the length of both conductors 21 and 22, traversing the YIG is .140 inch, one-third of that length is approximately .043 inch. Therefore, the spacing 48 between the conductors 21 and 22, .08 inch, is substantially greater than one-third the length of the longer conductor, as specified above.

The curve 41 in FIG. 3a illustrates the variation in delay, plotted in microseconds along the ordinate, versus frequency, plotted in megahertz (mHz) along the abscissa. Since the delay varies with frequency as illustrated, this is a dispersive delay line. Since the variation is linear over a wide portion of the spectrum, it would make a good pulse compression filter.

The curve 42 shown in FIG. 3b is a plot of insertion loss, plotted in decibels along the ordinate, versus frequency. At all the points plotted the insertion loss is substantially less than the attenuation of the undelayed leakage, represented by curve 43. Therefore an output signal which is greater than the undelayed leakage has been provided. For example, at 1500 mHz the output signal is approximately 30 db greater than the undelayed leakage making separation of the output signal from the undelayed leakage very convenient.

The portion of the bandwidth over which the delay variation with frequency is linear should also be noted. The useful bandwidth illustrated in FIG. 3a is greater that 600 mHz.

DESCRIPTION OF FIG. 5

Figure 5:
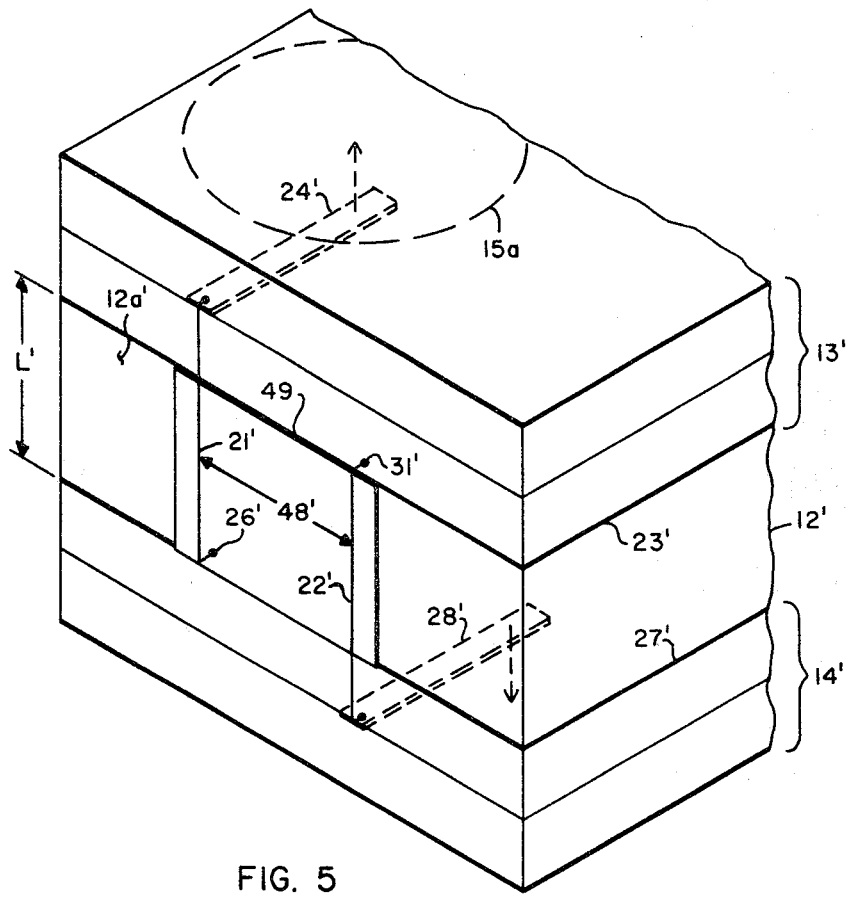
FIG. 5 is an illustration of an alternate embodiment of a two-port delay line.

FIG. 5 is an illustration of another embodiment of a magnetoelastic delay line constructed in accordance with the present invention. FIG. 5 is an alternative construction of FIG. 1c. The parts of a delay line not shown in FIG. 5 are the same as the delay line illustrated in FIGS. 1a and 1b.

The delay line of FIG. 5 includes the sample of single crystal yttrium iron garnet 10 shown in FIG. 1a. The delay line also includes input means for receiving a high frequency signal, having a predetermined range of frequencies, which is to be delayed. The input means includes the strip line section 13' having a first grounded conductor 23' and a first ungrounded conductor 24'. The delay line also includes a second transmission line 14' having a second grounded conductor 27' and a second ungrounded conductor 28' for translating a high frequency signal representative of the supplied high frequency signal, delayed by a predetermined amount.

The FIG. 5 delay line further includes a block of conductive material 12' having a substantially flat face 12a' adjacent and parallel to the polished face of the YIG material 10 having the first and second grounded conductors 23' and 27' connected to the conductive material 12' along the length of the respective conductors 23' and 27'. As stated, face 12a', of conductive material 12', is substantially flat and does not include the grooves 25 and 30 illustrated in FIG. 1c.

The FIG. 5 delay line further includes first thin conductor 21' positioned along the height L' of the flat face 12a', isolated from the flat face by a layer of dielectric material 49 and having a width less than .010 inch. The conductor 21' which is coextensive with the flat face 12a'. to the ungrounded conductor 24' of transmission line 13' and coupled at the opposite end of the flat face 12a' to the block of conductive material 12' at junction 26' for coupling electromagnetic energy to the YIG material 10 as a result of high frequency current flow in the portion of the conductor 21' which is coextensive with the flat face 12a'.

In FIG. 5 as in FIG. 1c the height L' of the block of conductive material 12 is substantially the same as the height of the face 10a of the YIG bar 10 and therefore the dimension L' also represents the length of the portion of the conductor which is coextensive with the face of the YIG bar 10.

The delay line further includes means for subjecting the YIG material 10 to a spatially varying D-C bias field which increases away from the polished face 10a into the YIG material 10 illustrated as a pair of permanent magnets 17 and 18 in FIG. 1. The requirements of the field described with reference to FIGS. 1a through 1c are identical for the FIG. 5 embodiment.

The FIG. 5 delay line further includes a second thin conductor 22' positioned along the length L' of the flat face 12a', isolated from the block of dielectric material 12' along said flat face by a layer of conductive material 49 and having a width less than .010 inch. In FIG. 5 the same dielectric layer 49 isolates wires 21' and 22' from the block of conductive material 12' in the region of the flat face 12a'. It will be obvious that this isolation could be provided by two separate pieces of dielectric material individually associated with the respective conductors 21' and 22'.

The second thin conductor 22' is coupled at one end of the flat face 12a' to the ungrounded conductor 28' of transmission line 14' and coupled at the opposite end of the flat face 12a' to the block of conductive material at junction 31' for producing a current flow in the second conductor 22' which flows in the opposite direction of the current flow in conductor 21' representative of the high frequency signal coupled to the conductor 21', delayed by a predetermined amount.

OPERATION OF FIG. 5

The operation of the FIG. 5 embodiment is similar to the operation of the FIGS. 1a, 1b and 1c embodiment. The signal to be delayed is coupled to transmission line 13' from the signal generator through connector 15. Current flow in the first conductor 21' couples energy to the YIG material 10 which propagates in accordance with the propagation path described by FIG. 2. The delayed signal is detected by the second thin conductor 22' and accordingly a signal is developed in conductor 22' which is representative of the signal flowing in conductor 21' delayed by a predetermined amount. The output signal is then coupled from conductor 22' to the load circuit 20 via strip-line 14' for further processing.

The FIG. 5 device is simpler and easier to construct than the FIG. 1c device. As stated, there are no grooves in the front face 12a' of the FIG. 5 device such as illustrated at 25 and 30 in the FIG. 1c device, making for simpler fabrication. However, it is apparent that the shielding of return or ground currents which the grooves in FIG. 1c provide is not provided in the FIG. 5 embodiment. Therefore, as would be expected, the results obtained are not quite as good as the FIG. 1c device. However, the FIG. 5 device does provide good coupling and delayed outputs which are substantially greater than the undelayed leakage are readily obtainable. This is due to the fact that the ground currents are dispersed somewhat over the face of the ground plane 12a' which is separated by a finite distance from the YIG material 10.

Figure 6A:
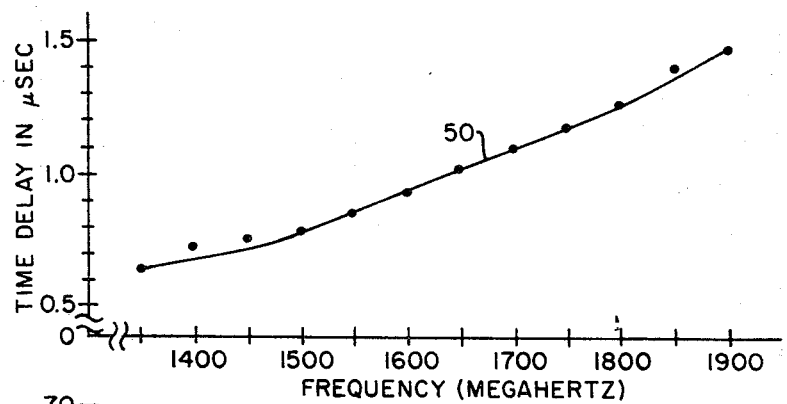
FIGS. 6a and 6b are graphical illustrations of the performance of a FIG. 5 delay line actually constructed and tested.
Figure 6B:
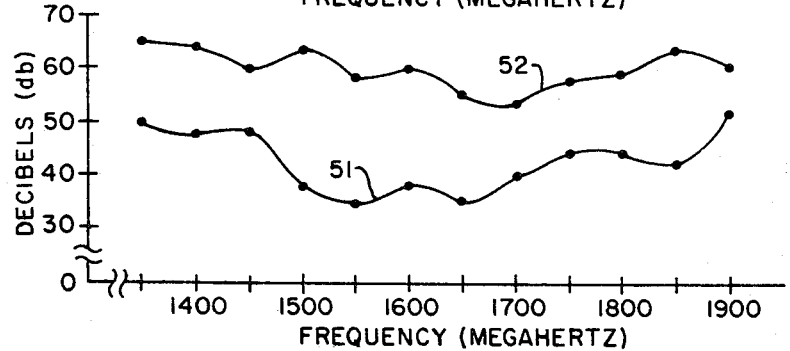

FIGS. 6a and 6b are graphical illustrations of the results achieved in a FIG. 5 delay line actually constructed and tested. The following is a list of the relevant parameters utilized in the FIG. 5 delay line which was constructed.

[100] single crystal YIG bar—.140 in. x .140 in. x .310 in.
Wire size of conductor 21'—.002 in.
Wire size of conductor 22'—.002 in.
Distance 48'—.080 in.
Dielectric sheet 49—.001 Teflon.

Means for supplying magnetic field—Six inch laboratory magnet—Bias field in region of YIG is 1.12 kilogauss.

As illustrated by the curve 50 in FIG. 6a, the FIG. 5 delay line produces a linear variation of delay with frequency as does the FIG. 1b delay line. The insertion loss illustrated by curve 51 in FIG. 6b is substantially less than the attenuation of the undelayed leakage illustrated by curve 52. Although the difference between the insertion loss and undelayed leakage is more than enough to make feasible the separation of the desired output signal from the spurious signals, the results are not quite as good as the FIG. 1c device as previously stated. For example, FIG. 3b indicates the difference between insertion loss and undelayed leakage at 1500 mHz. is approximately 30 db, while for the FIG. 5 device, FIG. 6b indicates that the comparable difference is approximately 25 db.

The spacing 48' is again equal to .08 inch which is substantially less one-third the length (L') of the longer conductor which is .043 inch.

In FIG. 1c coupling between conductors 21 and 22 through the air is prevented by locating the conductors in grooves 25 and 30 respectively. In FIG. 5 coupling through the air is minimized by separating the conductors by a minimum distance. The conductors must be separated by at least four times the distance between the YIG material and the block of conductive material 12'. In the above example that distance is .012 inch (four times the thickness of conductors 21' and 22' plus the thickness of Teflon sheet). Therefore the .080 separation utilized is well within this criteria.

DESCRIPTION OF FIG. 7

Figure 7A:
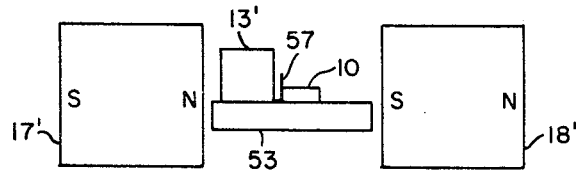
FIGS. 7a, 7b and 7c illustrate another embodiment of a two-port magnetoelastic delay line constructed in accordance with the present invention.
Figure 7B:
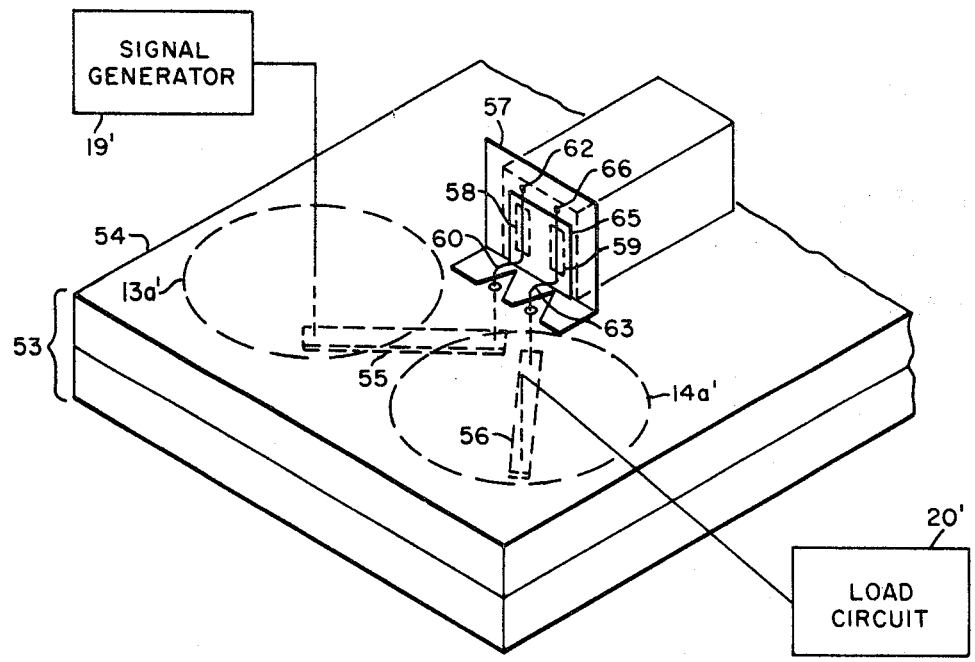
Figure 7C:
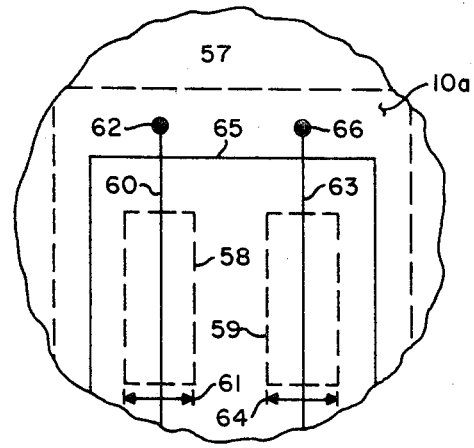

FIGS. 7a through 7c illustrate a two-port magnetoelastic delay line constructed in accordance with the present invention.

FIG. 7a is a sideview of the delay line shown approximately actual size. FIG. 7a illustrates a sample of YIG material 10 positioned on the section of strip-line 53. Strip-line section 53 is actually two separate transmission lines or strip-lines, there being two separate ungrounded conductors positioned between the two outer grounded conductors. However, it is possible to use separate grounded conductors with each of the ungrounded conductors. Signals are coupled to and from the delay line by connectors 13' and 14', which is hidden by connector 13', and the separate ungrounded conductors of strip-line section 53. The magnetic insulator 10 is positioned between the permanent magnets 17' and 18' in order to subject the magnetic insulator material to a D-C bias field.

FIG. 7b is an expanded isometric view of a section of the FIG. 7a delay line in which the connectors 13' and 14', permanent magnets 17' and 18' and a portion of strip-line 53 have been removed to facilitate understanding of the present invention. The location of connectors 13' ad 14' are indicated by the dotted circles 13a' and 14a', respectively. In addition, block diagram representations of signal generator 19' and load circuit 20' have been included in order to indicate the orientation of the delay line in a signal processing system.

FIG. 7c s a further expanded partial front view of the magnetic insulator material 10 more clearly illustrating the relative sizes and orientations of the electromagnetic couplers.

As stated, the FIG. 7 delay line includes a sample of magnetic insulator material 10, such as a sample of yttrium iron garnet of the type described in conjunction with the description of FIGS. 1 and 5, including the polished face 10a.

The delay line also includes input means for receiving a high frequency signal, having a predetermined range of frequencies, which is to be delayed. The input means includes the strip-line section consisting of grounded conductor 54 and a first ungrounded conductor 55. The delay line also includes utilization load means including a second transmission line consisting of the grounded conductor 54 and the ungrounded conductor 56, for translating the high frequency signal representative of the supplied high frequency signal delayed by a predetermined amount.

The delay line further includes a thin layer of conductive material 57, positioned contiguous to the polished face 10a of the YIG material 10, and having first and second narrow apertures 58 and 59, separated by a portion of the conductive material and each having a width less than .03 times the shortest free space wavelength of said predetermined frequencies and having said first and second grounded conductors connected to the side of the conductive material opposite the YIG material 10. In FIG. 7 it is apparent that grounded conductor 54 is utilized as the grounded conductor for both transmission lines which include ungrounded conductors 55 and 56 and therefore in the FIG. 7 said first and second grounded conductors are physically the same conductor, conductor 54.

The FIG. 7 delay line further includes a first thin conductor 60, having a width less than .010 inch, shielded from the YIG material 10 by the thin layer of conductive material 57, except for a portion of the conductive wire 60 which traverses the first aperture 58, transverse to its width 61. Conductor 60 has a width which is substantially less than the width 61 of aperture 60 and is coupled at one end to the ungrounded conductor 55 and at the opposite end to the same side of the sheet of conductive material 57 as the grounded conductor 54 at junction 62 for coupling electromagnetic energy to the YIG material 10 as the result of high frequency current flow in the portion of the conductor 60 which traverses the aperture 58 while causing substantially all the return currents associated with the current flow in said conductor wire 60 to be shielded from the YIG material 10.

The delay line also includes means for subjecting the YIG material to a spatially varying D-C magnetic bias field which increases away from the polished face 10a into the YIG material 10 illustrated as a pair of permanent magnets 17' and 18'. The requirements of the bias field are identical to the bias field described with reference to FIGS. 1 and 5.

The FIG. 7 delay line further includes a second thin conductor 63, having a width less than .010 inch, shielded from the YIG material 10 by the thin layer of conductive material 57, except for a portion of the conductive wire 63 which traverses the aperture 59 transverse to its width 64. The thin conductor 63 has a width which is substantially less than the width 64 of said aperture 59 and is coupled at one end to the ungrounded conductor 56 and at the opposite end to the same side of the sheet of conductive material 57 as the grounded conductor 54, at junction 66, for producing a current flow in the conductor 63 representative of the high frequency signal coupled to the conductor 60, delayed by a predetermined amount, while causing substantially all the return currents associated with current flow in the conductor 63 to be shielded from the YIG material 10.

The delay line also includes a thin sheet of dielectric material 65 which isolates conductors 60 and 63 from the thin conductive member 57 in the region of the apertures 58 and 59.

OPERATION OF FIG. 7

The operation of the FIG. 7 embodiment is similar to the operation of the FIG. 1 and FIG. 5 embodiments. The principal difference is in the nature of the shielded coupling devices illustrated in FIG. 7. Shielded coupling devices of this type are the subject matter of the above-mentioned copending application of Edward F. Heldt, in which this type of coupler is described and the operation fully explained. In brief, the input and output couplers, respectively, consist of the thin conductive sheet 57, having narrow apertures 58 and 59 traversed by conductors 60 and 63, respectively. In the region of the apertures, the conductors are separated from the conductive material 57 by the dielectric sheet 65. Current passing through conductor 60 couples energy to the magnetic insulator material 10 and energy coupled from the magnetic insulator material induces a current in conductor 63, which is representative of the input signal coupled to conductor 60 from signal generator 19', delayed by a predetermined amount. The remainder of the operation of the FIG. 7 embodiment is substantially the same as the FIG. 1 embodiment. The propagation of energy in the YIG is exactly as described in conjunction with the description of FIG. 2. As more fully explained in the above-mentioned copending application of Edward F. Heldt, the width of the slots 60 and 63 should be no greater than .03 times the free space wavelength of said predetermined frequencies.

As in the FIG. 1 and FIG. 5 embodiments, the conductors 60 and 63 should be separated by at least one-third the length of the portion of the conductors which traverse the apertures 58 and 59. Adequate shielding against direct coupling through the air is provided by having a portion of the conductive material 57 separating the apertures 58 and 59 so that they are in fact two distinct apertures. It will be noted that the FIG. 7 embodiment provides shielding of the ground currents by causing them to flow on the side of the conductive member 57 opposite the polished face 10a of the YIG material 10.

As further described in the copending application of Edward F. Heldt other configurations for the apertures 58 and 59 may be utilized although the elongated slot illustrated in FIGS. 7b and 7c is preferable to a circular aperture of comparable width. As is also fully described in the Heldt application the widths 61 and 64 of the apertures represent a compromise between the desired coupling efficiency and the isolation required, and should be less than one-eighth of an inch.

The coupling conductors 60 and 63 should be as close to the YIG material 10 as possible. Therefore it is preferred to push the conductors 60 and 63 through their respective apertures 58 and 59 so that they are separated from the YIG bar 10 by only the thickness of the dielectric sheet, which is preferably not greater than .001 inch thick. If more efficient coupling is required, portions of the dielectric sheet may be cut away so that the conductors are in direct contact with the YIG bar 10.

While there have been described what are at present considered to be the preferred embodiments of this invention, it will be obvious to those skilled in the art that various changes and modifications may be made therein without departing from the invention and it is therefore, aimed to cover all such changes and modifications as fall within the true spirit and scope of the invention.

What is claimed is:
1. A two-port magnetoelastic delay line comprising:
a sample of magnetic insulator material having a surface area capable of reflecting elastic waves;
first shielded coupling means including a first conductor having a portion of its length contiguous to said surface area for launching a medium-K wave in the magnetic insulator;
means for subjecting the magnetic insulator material to a spatially varying magnetic bias field which increases from said surface area into the magnetic insulator material for causing said medium-K wave to convert to an exchange spin-wave having a propagation component in the direction of said surface area, which exchange spin-wave converts to an elastic wave which is reflected from said surface area, which elastic wave reconverts to an exchange spin-wave which continues to propagate away from said surface area, which spin-wave reconverts to a second medium-K wave which propagates back towards said surface area;
and second shielded coupling means including a second conductor for coupling the energy contained in said second medium-K wave from the magnetic insulator to produce a signal in said second conductor representative of the high frequency signal in said first conductor delayed by a predetermined amount, said second conductor separated and shielded from said first conductor an having a portion of its length contiguous to said surface area at a position separated from the region of the magnetic insulator which is highly excited by the first conductor by a distance sufficient to insure that undelayed leakage is not coupled directly from the first conductor through the magnetic insulator material to the second conductor in an amount greater than the delayed energy coupled to the second conductor.

2. A two-port magnetoelastic delay line as specified in claim 1 in which the magnetic insulator material is a sample of single crystal yttrium iron garnet (YIG).

3. A two-port magnetoelastic delay line comprising:
a sample of single crystal magnetic insulator material having a polished face;
first shielded electromagnetic coupling means including a first conductor having a portion of its length contiguous to the polished face of the magnetic insulator for coupling electromagnetic energy to the magnetic insulator material as a result of high frequency current flow in said first conductor;
means for subjecting the magnetic insulator to a spatially varying magnetic bias field which increases from the polished face into the magnetic insulator material for causing the wavelength of the propagating waves to decrease as they propagate away from the polished face;
and second shielded electromagnetic coupling means including a second conductor separated and shielded from said first conductor and having a portion of its length contiguous to the polishe face of the magnetic insulator material for coupling electromagnetic energy from the magnetic insulator material to produce a signal in said second conductor representative of the high frequency signal in said first conductor delayed by a predetermined amount, the distance between said first and said second conductors being greater than one-third the length of the longer of the portions of said first and second conductors which are contiguous with said magnetic insulator for preventing any substantial amount of undelayed leakage from being coupled directly from the first conductor through the magnetic insulator material to the second conductor.

4. A two-port magnetoelastic delay line as specified in claim 3 in which the magnetic insulator material is a sample of single crystal yttrium iron garnet (YIG).

5. A two-port magnetoelastic delay line, comprising:
a sample of single crystal yttrium iron garnet (YIG) having a polished face;
input means for receiving a high frequency signal which is to be delayed;
first shielded coupling means for coupling electromagnetic energy to the YIG material representative of said high frequency signal for launching a magnetostatic wave in said YIG material, including a first conductor responsive to said high frequency signal and having a portion of its length contiguous with the polished face of the YIG material and a shielding member having a surface area substantially larger than the surface area of said portion of the first conductor for confining the electromagnetic fields associated with current flow in said first conductor;
means for subjecting the YIG material to a spatially varying D–C magnetic bias field which increase away from the polished face into the YIG material for causing the wavelength of said magnetostatic waves to decrease as they propagate away from the polished face;
and a second shielded coupling means for coupling electromagnetic energy from said YIG material to produce an output signal representative of the high frequency signal coupled to said first conductor delayed by a predetermined amount, including a second conductor having a portion of its length contiguous to the polished face of the YIG material outside the region of the polished face highly excited by current flow in said first conductor and shielded from said first conductor by a shielding member having a surface area substantially larger than the surface area of said portion of the second conductor for confining the electromagnetic fields associated with current flow in said second conductor.

6. A two-port magnetoelastic delay line as specified in claim 5 in which said first and second conductors are separated by at least one-third the length of the longer of said first and second conductor portions which are contiguous with the YIG material.

7. A two-port magnetoelastic delay line comprising:
a sample of single crystal yttrium iron garnet (YIG) having a polished face;
input means for receiving a high frequency signal having a predetermined range of frequencies, which is to be delayed, said input means including a first transmission line means having a first grounded conductor and a first ungrounded conductor;
utilization load means including a second transmission line having a second grounded conductor and a second ungrounded conductor for translating a high frequency signal representative of the supplied high frequency signal delayed by a predetermined amount;
a thin layer of conductive material contiguous to the polished face of the YIG material and having first and second narrow apertures separated by a portion of the conductive material and each having a width less than .03 times the shortest free space wavelength of said predetermined frequencies and having said first and second grounded conductors connected to the side of conductive material opposite the YIG material;
a first thin conductor shielded from the YIG material by the thin layer of conductive material except for a portion of the wire which traverses said first aperture transverse to its width and having a width which is substantially less than the width of said aperture, said wire coupled at one end to the ungrounded conductor of said first transmission line and at the opposite end to the same side of the sheet of conductive material as said first grounded conductor for coupling electromagnetic energy to the YIG material as a result of high frequency current flow in the portion of said conductor which traverses the aperture while causing substantially all the return currents associated with the current flow in said wire to be shielded from the YIG material;
means for subjecting the YIG material to a spatially varying D-C magnetic bias field which increases away from the polished face into the YIG material;
and a second thin conductor shielded from the YIG material by the thin layer of conductive material except for a portion of the wire which traverses said second aperture tranverse to its width and having a width which is substantially less than the width of said aperture, said second wire coupled at one end to the ungrounded conductor of said second transmission line and at the opposite end to the same side of the sheet of conductive material as said second grounded conductor for producing a current flow in said second conductor representative of the high frequency signal coupled to said first conductor delayed by a predetermined amount while causing substantially all the return currents associated with current flow in said second conductor to be shielded from the YIG material.

8. A two-port magnetoelastic delay line as specified in claim 7 in which said first and second conductors are substantially parallel and are separated by at least one-third of the length of the longer of said first and second conductor portions which traverse their respective apertures.

9. A delay line as specified in claim 8 in which the width of said first and second apertures is less than one-eighth of an inch, the width of said first and second conductive wires is less than .010 inch and each of said first and second conductors is separated from the layer of conductive material by a sheet of dielectric material which is in the order of .001 inch thick.

10. A delay line as specified in claim 8 in which the YIG material is oriented in the magnetic bias field to minimize the insertion loss and minimize suprious delay signals.

11. A two-port magnetoelastic delay line comprising:
a sample of single crystal yttrium iron garnet (YIG) having a polished face;
input means for receiving a high frequency signal having a predetermined range of frequencies, which is to be delayed, said input means including a first transmission line means having a first grounded conductor and a first ungrounded conductor;
utilization load means including a second transmission line having a second grounded conductor and a second ungrounded conductor for translating a high frequency signal representative of the supplied high frequency signal delayed by a predetermined amount;
a block of conductive material having a substantially flat face contiguous with the polished face of the YIG material and having first and second narrow grooves along one dimension of said flat face which are separated by a finite portion of the flat face and each of whose width is less than .03 times the shortest free space wavelength of said predetermined frequencies and having said first and second grounded conductors connected to said block of conductive material;
a first thin conductor positioned along the length of said first groove, isolated from the block of conductive material along the length of the groove and coupled at one end of the groove to the ungrounded conductor of said first transmission line and coupled at the opposite end of the groove to the block of conductive material for coupling electromagnetic energy to the YIG material as a result of high frequency current flow in the portion of said first conductor coextensive with said first groove while causing substantially all the return currents associated with the current flow in said first conductor to be shielded from the YIG material;
means for subjecting the YIG material to a spatially varying D-C magnetic bias field which increase away from the polished face into the YIG material;
and a second thin conductor positioned along the length of said second groove and isolated from the conductive material along the length of the groove and coupled at one end of said second groove to said second ungrounded conductor and coupled at the opposite end of said second groove to the block of conductive material for producing a current flow in said second conductor representative of the high frequency signal coupled to said first conductor delayed by a predetermined amount while causing substantially all the return currents associated with current flow in said second conductor to be shielded from the YIG material.

12. A two-port magnetoelastic delay line as specified in claim 11 in which said first and second conductors are substantially parallel and are separated by at least one-third the length of the portion of said conductors coextensive with the polished face of the YIG material.

13. A delay line as specified in claim 12 in which the width of said first and second grooves is less than one-eighth of an inch, the width of said first and second conductors is less than .010 inch and in which said first and second conductors are isolated from the block of conductive material along the length of said first and second grooves by dielectric material positioned in said first and second grooves between said conductors and the block of conductive material.

14. A delay line as specified in claim 11 in which the YIG material is oriented in the magnetic bias field to minimize the insertion loss and minimize the spurious delay signals.

15. A two-port magnetoelastic delay line comprising:
a sample of single crystal yttrium iron garnet (YIG) having a polished face;
input means for receiving a high frequency signal, having a predetermined range of frequencies, which is to be delayed, said input means including a first transmission line means having a first grounded conductor and a first ungrounded conductor;
utilization load means including a second transmission line having a second grounded conductor and a second ungrounded conductor for translating a high frequency signal representative of the supplied high frequency signal delayed by a predetermined amount;
a block of conductive material having a substantially flat face adjacent and parallel to the polished face of the YIG material and having said first and second grounded conductors connected to said conductive material;
a first thin conductor positioned along the height of said flat face and isolated from the flat face by a layer of dielectric material and coupled at one end of said flat face to the ungrounded conductor of said first transmission line and coupled at the opposite end of said flat face to the block of conductive material for coupling electromagnetic energy to the YIG material as a result of high frequency current flow in the portion of said first conductor coextensive with said flat face;
means for subjecting the YIG material to a spatially varying D-C magnetic bias field which increases away from the polished face into the YIG material;
and a second thin conductor positioned along the length of said flat face, isolated from the block of conductive material along said flat face by a layer of dielectric material and coupled at one end of the flat face to the ungrounded conductor of said second transmission line and coupled at the opposite end of the flat face to the block of conductive material for producing a current flow in said second conductor representative of the high frequency signal coupled to said first conductor delayed by a predetermined amount.

16. A two-port magnetoelastic delay line as specified in claim 15 in which said first and second conductors are substantially parallel and are separated by at least one-third the length of the portion of said conductors coextensive with the polished face of the YIG material and separated by at least four times the distance between the YIG material and the block of conductive material.

17. A two-port magnetoelastic delay line as specified in claim 16 in which the width of said first and second conductors is less than .01 inch and in which current in said first and second conductors is caused to flow in opposite directions.

18. A two-port magnetoelastic delay line as specified in claim 15 in which the YIG material is oriented in the magnetic bias field to minimize the insertion loss and minimize the spurious delay signals.

References Cited
UNITED STATES PATENTS

| | | | |
|---|---|---|---|
| 3,244,993 | 4/1966 | Schloemann | 330—5 X |
| 3,307,120 | 2/1967 | Denton et al. | 333—30 |
| 3,366,896 | 1/1968 | Skudera et al. | 333—30 |

HERMAN K. SAALBACH, Primary Examiner

P. L. GENSLER, Assistant Examiner

U.S. Cl. X.R.

333—31